United States Patent
Kim et al.

(10) Patent No.: US 9,460,559 B2
(45) Date of Patent: Oct. 4, 2016

(54) METHOD OF GENERATING TESSELLATION DATA AND APPARATUS FOR PERFORMING THE SAME

(71) Applicant: SAMSUNG ELECTRONICS CO., LTD., Suwon-si, Gyeonggi-do (KR)

(72) Inventors: Seok Hoon Kim, Suwon-si (KR); Chang Hyo Yu, Yongin-si (KR); Kil Whan Lee, Seoul (KR); Yong Ha Park, Seongnam-si (KR)

(73) Assignee: SAMSUNG ELECTRONICS CO., LTD., Suwon-Si, Gyeonggi-Do (KR)

(*) Notice: Subject to any disclaimer, the term of this patent is extended or adjusted under 35 U.S.C. 154(b) by 253 days.

(21) Appl. No.: 14/306,782

(22) Filed: Jun. 17, 2014

(65) Prior Publication Data
US 2015/0042649 A1    Feb. 12, 2015

(30) Foreign Application Priority Data
Aug. 12, 2013  (KR) .................. 10-2013-0095159

(51) Int. Cl.
*G06T 17/20* (2006.01)
*G06T 9/00* (2006.01)

(52) U.S. Cl.
CPC .............. *G06T 17/20* (2013.01); *G06T 9/001* (2013.01); *G06T 2210/52* (2013.01)

(58) Field of Classification Search
CPC ..... G06T 17/20; G06T 9/001; G06T 15/005; G06T 2200/28; G06T 15/40; G06T 17/00; G06T 17/005; G06T 17/05; G06T 2210/12; G06T 2210/36; G06T 9/004; G06T 9/20
See application file for complete search history.

(56) References Cited

U.S. PATENT DOCUMENTS

| | | | |
|---|---|---|---|
| 6,215,500 B1 | 4/2001 | Deering | |
| 7,034,823 B2 | 4/2006 | Dunnett | |
| 7,423,644 B2 | 9/2008 | Goel et al. | |
| 7,570,267 B2 | 8/2009 | Patel et al. | |
| 7,746,342 B2 | 6/2010 | Yamada | |
| 7,764,285 B2 | 7/2010 | Wardetzky et al. | |
| 8,207,965 B2 | 6/2012 | Vinchon | |
| 2001/0050682 A1* | 12/2001 | Deering ................ | G06T 9/001 345/420 |
| 2003/0117405 A1* | 6/2003 | Hubrecht ............... | G06T 17/00 345/543 |
| 2004/0257363 A1* | 12/2004 | Veach ................... | G06T 17/205 345/423 |
| 2005/0259101 A1* | 11/2005 | Westgaard ............. | G06T 17/20 345/420 |
| 2009/0184957 A1* | 7/2009 | Kim ....................... | G06T 9/20 345/420 |
| 2011/0046923 A1* | 2/2011 | Lee ......................... | G06T 9/001 703/1 |
| 2011/0057931 A1 | 3/2011 | Goel et al. | |

(Continued)

OTHER PUBLICATIONS

Luffel, M., et al. Grouper: A Compact, Streamable Triangle Mesh Data Structure. No. LLNL-JRNL-503653. Lawrence Livermore National Laboratory (LLNL), Livermore, CA, 2011, IEEE Transactions on Visualization and Computer Graphics.*

*Primary Examiner* — Sultana M Zalalee
(74) *Attorney, Agent, or Firm* — F. Chau & Associates, LLC

(57) ABSTRACT

A method of generating tessellation data include analyzing patch data of each of a plurality of patches; generating shared data that is shared by the patches, non-shared data that are not shared by the patches, and attribute data on an attribute of control points of each of the patches from the patch data according to a result of the analyzing; and compressing the non-shared data and the attribute data.

15 Claims, 10 Drawing Sheets

(56) References Cited

U.S. PATENT DOCUMENTS

| | | | |
|---|---|---|---|
| 2011/0085736 A1* | 4/2011 | Dmitriev | G06T 17/20 382/199 |
| 2011/0216068 A1* | 9/2011 | Sathe | G06T 17/20 345/441 |
| 2011/0267346 A1 | 11/2011 | Howson | |
| 2011/0310102 A1* | 12/2011 | Chang | G06T 17/20 345/423 |
| 2012/0182298 A1 | 7/2012 | Sun | |
| 2012/0229464 A1 | 9/2012 | Fishwick | |

* cited by examiner

METHOD OF GENERATING TESSELLATION DATA AND APPARATUS FOR PERFORMING THE SAME

CROSS-REFERENCE TO RELATED APPLICATIONS

This application claims priority under 35 U.S.C. §119(a) from Korean Patent Application No. 10-2013-0095159 filed on Aug. 12, 2013, the disclosure of which is incorporated by reference in its entirety herein.

BACKGROUND

1. Technical Field

Embodiments of the inventive concept relate to a method of generating tessellation data, and more particularly, to a method of generating compressed tessellation data.

2. Discussion of Related Art

Tessellation is the tiling of a plane using one or more geometric shapes, called tiles, with no overlaps and no gaps. In computer graphics, the term "tessellation" is used to describe the organization of information needed to give the appearance of realistic three-dimensional objects.

A graphics processing unit (GPU) may render an image of an object to be displayed on a display. The GPU may perform a tessellation operation in the course of rendering the image of the object to provide a finer image of the object.

The GPU generates several primitives for the image of the object through the tessellation operation and stores data corresponding to the primitives in an external memory. However, since the GPU needs to read and write a lot of data corresponding to the primitives in order to perform other operations after the tessellation operation, it may consume a lot of power and require a large bandwidth.

SUMMARY

According to an exemplary embodiment of the inventive concept, there is provided a method of generating tessellation data. The method includes analyzing patch data of each of a plurality of patches; generating shared data that is shared by the patches, non-shared data that are not shared by the patches, and attribute data on an attribute of control points of each of the patches from the each patch data according to an analysis result; and compressing the non-shared data and the attribute data.

The method may further include maintaining a group data structure relating to the shared data, a patch data structure relating to each of the non-shared data, and a control point data structure relating to each of the attribute data based on the shared data, the non-shared data, and the attribute data.

The shared data may include the number of control points, a partitioning type, a domain face type, output data topology, and a tessellation factor of the patches.

The non-shared data may include an index of each of the control points included in each of the patches and a tessellation factor of each patch.

The compressing may include compressing each patch data structure and compressing each control point data structure.

The group data structure may include a pointer indicating each of patch data structures respectively matching the patches related with the group data structure. The group data structure may include a pointer indicating a next group data structure to be transmitted following the current group data structure. The group data structure may not include the pointer indicating the next group data structure when a size of the group data structure is constant.

According to an exemplary embodiment of the inventive concept, there is provided a system on chip (SoC) including a tessellation data generator configured to analyze patch data of a plurality of patches, to generate a group data structure that is shared by the patches, a patch data structure for each of the patches that is not shared by the patches, and a control point data structure including attribute data on an attribute of control points of each of the patches from the patch data according to a result of the analysis, and to encode the data structures; and a graphics processing unit (GPU) configured to decode the encoded data structures and process data included in the decoded data structures.

The group data structure may include shared data that is shared by the patches and the shared data may include the number of control points, a partitioning type, a domain face type, and output data topology.

The patch data structure may include non-shared data that is not shared by the patches and the non-shared data may include an index of each of the control points included in each of the patches and a tessellation factor of each patch. The patch data structure and the control point data structure may be able to be compressed. For example, the GPU may be configured to compress the patch data structure and the control point data structure. The system on chip may be implemented as part of an application processor. The tessellation data generator may be implemented within a central processing unit.

According to an exemplary embodiment of the inventive concept, there is provided a data processing system including the above-described system on chip, a memory configured to store the patch data of the patches, and a memory interface configured to transmit the patch data of the patches from the memory to the system on chip.

According to an exemplary embodiment of the inventive concept, there is a provided a method of generating a hierarchal data structure for use in a tessellation operation. The method includes: generating a first data structure having shared data that is common to each patch among a plurality of patches; generating a plurality of second data structures for each patch, where each second data structure has indicates of all control points of the corresponding patch; and generating a plurality of third data structures for each patch, where each third data structure has attributes about the control points of a corresponding one of the patches.

The data within the second data structures may be unique from one another. In an embodiment, the first data structure includes pointers to each second data structure, and each second data structure includes a pointer to a corresponding one of the third data structures. The first data structure may include a pointer to a next data structure to be transmitted that includes shared data that is common to each patch among another plurality of patches. Data within each of the second and third data structures may be compressed. In an embodiment, either the first data structure includes a tessellation factor common to all the patches, or each second data structure includes its own distinct tessellation factor.

BRIEF DESCRIPTION OF THE DRAWINGS

The present inventive concepts will become apparent and more readily appreciated from the following description of the exemplary embodiments thereof, taken in conjunction with the accompanying drawings of which.

DETAILED DESCRIPTION

Figure 1:
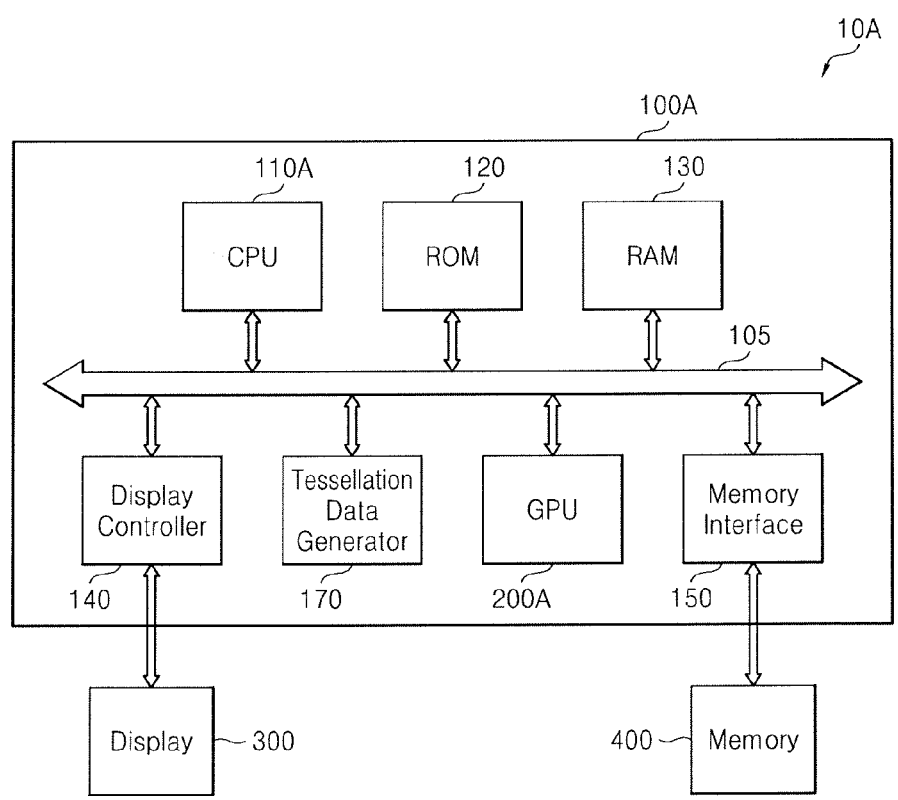
FIG. 1 is a block diagram of a data processing system according to an exemplary embodiment of the inventive concept.

The inventive concept now will be described more fully hereinafter with reference to the accompanying drawings, in which exemplary embodiments of the invention are shown. This invention may, however, be embodied in many different forms and should not be construed as limited to the exemplary embodiments set forth herein. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. As used herein, the singular forms "a", "an" and "the" are intended to include the plural forms as well, unless the context clearly indicates otherwise.

FIG. 1 is a block diagram of a data processing system 10A according to an exemplary embodiment of the inventive concept. Referring to FIG. 1, the data processing system 10A includes a data processing device 100A, a display 300, and a memory 400.

The data processing system 10A may be implemented as a personal computer (PC), a portable electronic device (or mobile equipment), or an electronic device including the display 300 that can display image data.

The portable electronic device may be a laptop computer, a cellular phone, a smart phone, a tablet PC, a mobile internet device (MID), a personal digital assistant (PDA), an enterprise digital assistant (EDA), a digital still camera, a digital video camera, a portable multimedia player (PMP), a personal navigation device or portable navigation device (PND), a handheld game console, a wearable computer, or an e-book reader.

The data processing device 100A may control the display 300 and/or the memory 400. The data processing device 100A may control the overall operation of the data processing system 10A.

A group of control points that define a part of a surface may be referred to as a patch. The data processing device 100A may analyze patch data of each of a plurality of patches output from the memory 400 and generate tessellation data (e.g., shared data that is shared by the patches, non-shared data that is not shared by the patches, and attribute data on the attribute of a control point of each of the patches) from the patch data of each of the plurality of patches according to the analysis result.

According to an exemplary embodiment of the inventive concept, the data processing device 100A compresses the non-shared data and the attribute data, respectively. As an example, a lossless compression algorithm such as Arithmetic Coding, Huffman Coding, or Delta Coding may be used to compress the data.

In an exemplary embodiment, the data processing device 100A maintains data structures for the shared data, the non-shared data, and the attribute data, respectively. For example, the data processing device 100A may maintain a group data structure relating to the shared data, a patch data structure relating to each non-shared data, and a control point data structure relating to each attribute data based on the shared data, the non-shared data, and the attribute data.

In an exemplary embodiment, the shared data among multiple patches includes the number of control points, a partitioning type (e.g., fractional odd, fractional even, integer, power2, etc.), a domain face type (e.g., triangle, quad, iso-line, etc.), and output data topology. In an exemplary embodiment, the non-shared data include indices of control points and inner/outer tessesIation factors which are different among patches. In an exemplary embodiment, tessellation factors are used to determine how much to subdivide a patch. For example, the tessellation factors may determine how many tiles a given patch will be subdivided into during tessellation.

The data processing device 100A may be implemented in a printed circuit board (PCB) such as a motherboard, an integrated circuit (IC) or a system on chip (SoC). For instance, the data processing device 100A may be a processor or an application processor.

The data processing device 100A includes a central processing unit (CPU) 110A, a read-only memory (ROM) 120, a random access memory (RAM) 130, a display controller 140, a memory interface 150, a tessellation data generator 170, and a graphics processing unit (GPU) 200A.

The CPU 110A may control the overall operation of the data processing device 100A. For instance, the CPU 110A may control the operations of the components 120, 130, 140, 150, 170, and 200A. The CPU 110A communicates with the components 120, 130, 140, 150, 170, and 200A through a bus 105. In addition, the CPU 110A may read and execute program instructions.

For instance, programs and data stored in the memory 120, 130, or 400 may be loaded into an internal memory, e.g., a cache memory (not shown), of the CPU 110A according to the control of the CPU 110A. In an exemplary embodiment, the CPU 110A includes multiple cores. A multi-core processor is a single computing component with two or more independent cores.

The ROM 120 may permanently store programs and/or data. In an exemplary embodiment, the ROM 120 is implemented as an erasable programmable ROM (EPROM) or an electrically erasable programmable ROM (EEPROM).

The RAM 130 may temporarily store programs, data, or instructions. The programs and/or data stored in the memory 120 or 400 may be temporarily stored in the RAM 130 according to the control of the CPU 110A, the control of the GPU 200A, or a booting code stored in the ROM 120. In an exemplary embodiment, the RAM 130 is implemented as dynamic RAM (DRAM) or static RAM (SRAM).

The display controller 140 may control the operation of the display 300. For instance, the display controller 140 may transmit image data, e.g., still image data, moving image data, three-dimensional (3D) image data or stereoscopic 3D image data, from the memory 400 to the display 300.

The memory interface 150 may function as a memory controller that can access the memory 400. For instance, the data processing device 100A and the memory 400 may communicate with each other through the memory interface 150. The data processing device 100A and the memory 400 may transmit data to and receive data from each other through the memory interface 150.

In an exemplary embodiment, the tessellation data generator 170 analyzes patch data of each of a plurality of patches output from the memory 400 and generates hierarchical data structures with respect to the patches based on the analysis result. For instance, the tessellation data generator 170 may analyze the patch data of each of the plurality of patches based on a patch type and generate the hierarchical data structures with respect to the patches based on the analysis result.

The patch type may be identified by a type of patch (e.g., a curve type or a surface type) and tessellation information (e.g., tessellation factor, a partitioning type, a domain face type, and/or output data topology and so on).

Figure 2:
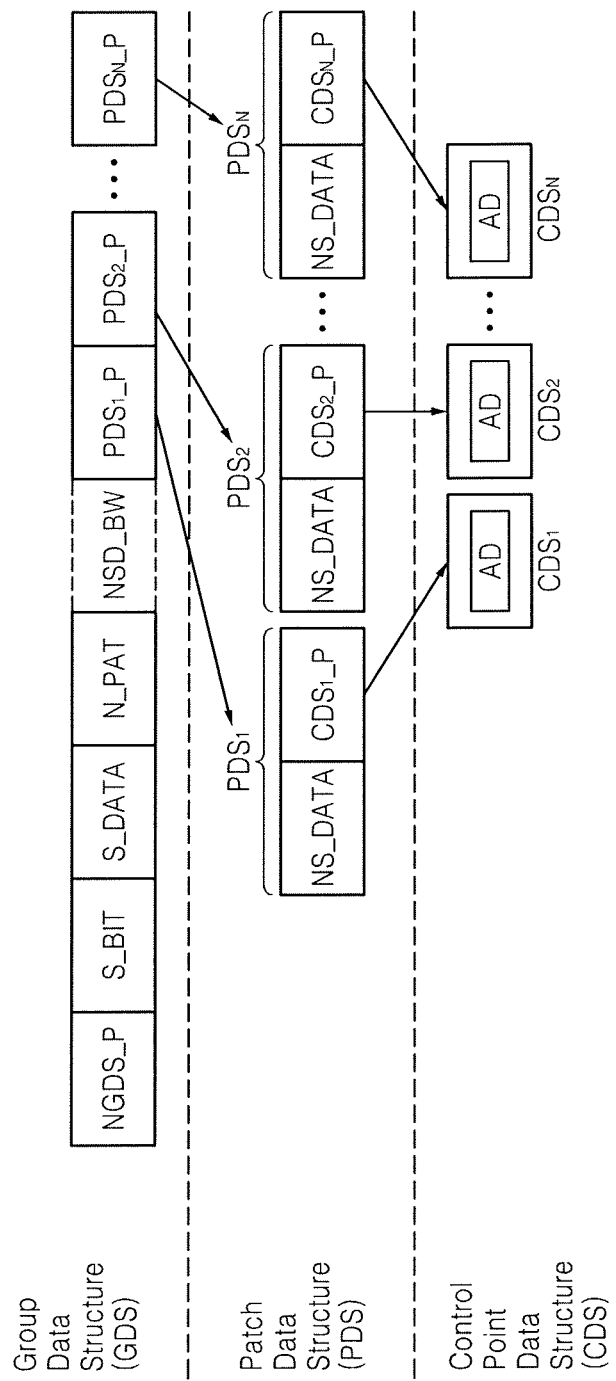
FIG. 2 is a diagram of hierarchical data structures generated by a tessellation data generator illustrated in FIG. 1 according to an exemplary embodiment of the inventive concept.

FIG. 2 is a diagram of hierarchical data structures generated by the tessellation data generator 170 illustrated in FIG. 1 according to an exemplary embodiment of the inventive concept. Referring to FIGS. 1 and 2, the tessellation data generator 170 analyzes patch data of each of a plurality of patches output from the memory 400 and generates shared data S_DATA shared by the patches, non-shared data NS_DATA that are not shared by the patches, and attribute data AD on the attribute of control points of each of the plurality of patch data according to the analysis result.

In an exemplary embodiment, the tessellation data generator 170 compresses the non-shared data NS_DATA and the attribute data AD, respectively.

The tessellation data generator 170 generates data, which is shared by each of a plurality of patches, from the patch data of each of the plurality patches as the shared data S_DATA. For instance, the tessellation data generator 170 may generate data which are similar to each other or the same as each other among each of a plurality of patches as the shared data S_DATA.

Figure 3:
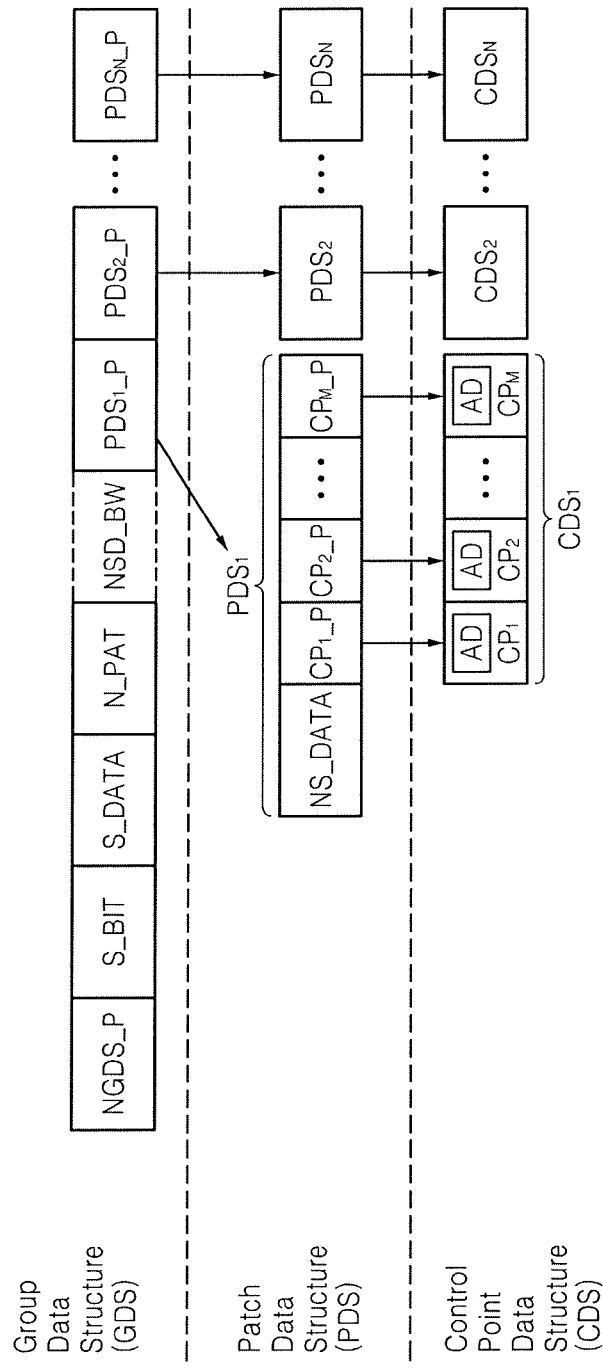
FIG. 3 is a diagram of hierarchical data structures generated by a tessellation data generator illustrated in FIG. 1 according to an exemplary embodiment of the inventive concept.
Figure 4:
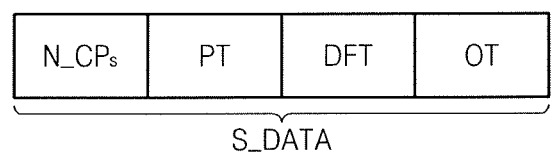
FIG. 4 is a structural diagram of shared data illustrated in FIGS. 2 and 3 according to an exemplary embodiment of the inventive concept.

FIG. 4 is a structural diagram of the shared data S_DATA illustrated in FIGS. 2 and 3 according to an exemplary embodiment of the inventive concept. Referring to FIG. 4, the shared data S_DATA includes the number of control points $N\_CP_S$, a partitioning type PT, a domain face type DFT, and output data topology OT. In an exemplary embodiment of the shared data S_DATA of FIG. 4, one or more of the control points $N\_CP_S$, the partitioning type PT, the domain face type DFT, and the output data topology OT may be omitted.

The number of control points $N\_CP_S$, the partitioning type PT, the domain face type DFT, and the output data topology OT may be substantially similar or the same among a plurality of patches. For instance, the partitioning type PT, the domain face type DFT, and the output data topology OT may be set according to the control of the CPU 110A. The partitioning type PT, the domain face type DFT, and the output data topology OT may be able to be programmed by a manufacturer or a user.

Figure 5:
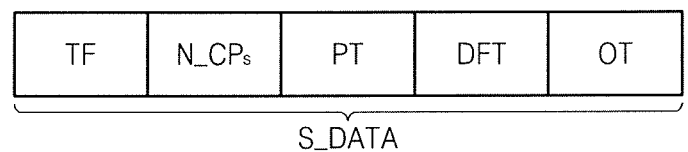
FIG. 5 is a structural diagram of shared data illustrated in FIGS. 2 and 3 according to an exemplary embodiment of the inventive concept.

FIG. 5 is a structural diagram of the shared data S_DATA illustrated in FIGS. 2 and 3 according to an exemplary embodiment of the inventive concept. Referring to FIG. 5, the shared data S_DATA includes a tessellation factor TF, the number of control points $N\_CP_S$, the partitioning type PT, the domain face type DFT, and the output data topology OT. In an exemplary embodiment of the shared data S_DATA of FIG. 5, one or more of the tessellation factor TF, the number of control points $N\_CP_S$, the partitioning type PT, the domain face type DFT, and the output data topology OT may be omitted.

The tessellation data generator 170 may set or define the tessellation factor TF shared by a plurality of patches according to the control of the CPU 110A. The tessellation factor TF included in the shared data S_DATA may be set by a manufacturer or a user.

Referring to FIGS. 1, 2, 4, and 5, the shared data S_DATA is data which is substantially common to a plurality of patches and may be data that can be shared by the patches. Accordingly, the shared data S_DATA may be generated in a single data set or single data structure for all of the patches.

The tessellation data generator 170 generates data which cannot be shared by a plurality of patches from the patch data of each of the patches as the non-shared data NS_DATA. For instance, the tessellation data generator 170 may generate data which are substantially not similar among the patches as the non-shared data NS_DATA. In an exemplary embodiment, the tessellation data generator 170 compresses the non-shared data NS_DATA.

Figure 6:
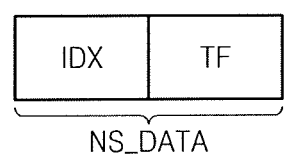
FIG. 6 is a structural diagram of non-shared data illustrated in FIG. 2 according to an exemplary embodiment of the inventive concept.

FIG. 6 is a structural diagram of the non-shared data NS_DATA illustrated in FIG. 2 according to an exemplary embodiment of the inventive concept. Referring to FIG. 6, the non-shared data NS_DATA includes an index IDX of each of several control points included in each of a plurality of patches and the tessellation factor TF of each of the patches. In an exemplary embodiment, the non-shared data NS_DATA includes the control points themselves.

In an exemplary embodiment where the tessellation factor TF is predetermined according to the control of the CPU 110A as shown in FIG. 5, the tessellation factor TF is not included in the non-shared data NS_DATA. Referring to FIGS. 1 and 2 and FIGS. 4 through 6, each non-shared data NS_DATA is different among a plurality of patches or is unique to each of the patches. The non-shared data NS_DATA is data that cannot be shared by the patches and may be generated with respect to each of the patches.

The tessellation data generator 170 may generate the attribute data AD on the attribute of control points with respect to each of a plurality of patches. The attribute data AD may include information about a position, color, normal vector and texture coordinate of each of control points included in each of the patches.

In an exemplary embodiment, the attribute data AD also includes information about a parametric equation for each of the patches. For example, the equation may be a curve equation, a surface equation, etc. For example, the curve equation may be a Hermite curve equation, a Bezier curve equation, a Non-uniform rational B-spline (NURBS) curve equation, a B-spline curve equation, etc. The attribute data AD may be generated with respect to each of the patches. In an exemplary embodiment, the tessellation data generator 170 compresses the attribute data AD.

As shown in FIG. 2 or 3, the tessellation data generator 170 maintains a group data structure GDS relating to the shared data S_DATA, patch data structures $PDS_1$ through $PDS_N$ relating to the non-shared data NS_DATA, and control point data structures $CDS_1$ through $CDS_N$ relating to the attribute data AD based on the shared data S_DATA, the non-shared data NS_DATA, and the attribute data AD.

The group data structure GDS includes the shared data S_DATA, a next group data structure indication pointer NGDS_P, an indication data S_BIT, number data N_PAT, and patch data structure indication pointers $PDS_1\_P$ through $PDS_N\_P$. The next group data structure indication pointer NGDS_P is a pointer indicating a next group data structure to be transmitted following the current group data structure GDS. For instance, the next group data structure indication pointer NGDS_P may indicate a memory address of the next group data structure to be transmitted after the current group data structure GDS is transmitted.

In an exemplary embodiment, when the size of the group data structure GDS is the same as that of the next group data structure, the group data structure GDS does not include the next group data structure indication pointer NGDS_P. For instance, when the size of the group data structure GDS is the same as that of the next group data structure, the memory address of the next group data structure may be calculated by the tessellation data generator 170 and/or the GPU 200A. In an exemplary embodiment of the group data structure GDS, the next group data structure includes a bit indicating whether the size of the group data structure is constant or not.

The indication data S_BIT indicates which of tessellation related data is shared with the group data structure GDS. In a frame, patches can share the same tessellation information such as partition type, face type, output topology, etc. In order to avoid data redundancy, these data are stored just one in a GDS. However, since all the tessellation information is not always shared, the indication data S_BIT can be used to indicate whether tessellation information is shared (e.g., S_BIT=1) or not shared (e.g., S_BIT=0). The number data N_PAT indicates the number of patches related with the group data structure GDS. The patch data structure indication pointers $PDS_1\_P$ through $PDS_N\_P$ are pointers respectively indicating the patch data structures $PDS_1$ through $PDS_N$ matching the respective patches related with the group data structure GDS. For example, in FIG. 2, if N=3, the number data N_PAT=3.

According to an exemplary embodiment, the group data structure GDS may also include an optional size data NSD_BW. The size data NSD_BW indicates the compressed size, e.g., bit-width of the non-shared data NS_DATA included in the patch data structures $PDS_1$ through $PDS_N$.

The tessellation data generator 170 embeds the shared data S_DATA, which can be shared by a plurality of patches, in the current group data structure GDS just once when transmitting the current group data structure GDS to the GPU 200A, which may reduce waste of the bandwidth of data and decrease power consumption for the transmission of the data. In addition, the GPU 200A reads just once the current group data structure GDS including the shared data S_DATA from the memory 400 to process the patches, which may be reduce the waste of the bandwidth of data and decrease power consumption for an operation of reading the data.

The patch data structures $PDS_1$ through $PDS_N$ include the non-shared data NS_DATA and control point data structure indication pointers $CDS_N\_P$ through $CDS_N\_P$, respectively.

The control point data structure indication pointers $CDS_N\_P$ through $CDS_N\_P$ are pointers respectively indicating the control point data structures $CDS_1$ through $CDS_N$ respectively matching the patch data structures $PDS_1$ through $PDS_N$.

Each of the control point data structures $CDS_1$ through $CDS_N$ includes the attribute data AD. Each of the patch data structures $PDS_1$ through $PDS_N$ may be efficiently compressed using data similarity among the patch data structures $PDS_1$ through $PDS_N$. The control point data structures $CDS_1$ through $CDS_N$ may be efficiently compressed due to high spatial locality of control points included in each of the patches.

FIG. 3 is a diagram of hierarchical data structures generated by the tessellation data generator 170 illustrated in FIG. 1 according to an exemplary embodiment of the inventive concept. Referring to FIG. 3, the tessellation data generator 170 analyzes patch data of each of a plurality of patches output from the memory 400 and generates the shared data S_DATA shared by the patches, the non-shared data NS_DATA that are not shared by the patches, and the attribute data AD on the attribute of control points of each of the patches from the patch data according to the analysis result.

As been described with reference to FIG. 2, the tessellation data generator 170 may maintain the group data structure GDS relating to the shared data S_DATA, the patch data structures $PDS_1$ through $PDS_N$ relating to the non-shared data NS_DATA, and the control point data structures $CDS_1$ through $CDS_N$ relating to the attribute data AD based on the shared data S_DATA, the non-shared data NS_DATA, and the attribute data AD.

The shared data S_DATA illustrated in FIG. 3 is the same as that described with reference to FIGS. 4 and 5. The non-shared data NS_DATA illustrated in FIG. 3 is the same as that described with reference to FIG. 6. The group data structure GDS illustrated in FIG. 3 is substantially the same as that illustrated in FIG. 2.

Unlike the embodiments illustrated in FIG. 2, each of the patch data structures $PDS_1$ through $PDS_N$ include the non-shared data NS_DATA and data structure indication pointers $CP_1\_P$ through $CP_M\_P$, and each of the control point data structures $CDS_1$ through $CDS_N$ include a plurality of data structures $CP_1$ through $CP_M$ in the embodiment illustrated in FIG. 3.

The data structure indication pointers $CP_1\_P$ through $CP_M\_P$ included in each of the patch data structures $PDS_1$ through $PDS_N$ are pointers respectively indicating the data structures $CP_1$ through $CP_M$ included in each of the control point data structures $CDS_1$ through $CDS_N$ respectively matching the patch data structures $PDS_1$ through $PDS_N$. Each of the data structures $CP_1$ through $CP_M$ include the attribute data AD of each of control points included in each of the patches respectively matching the patch data structures $PDS_1$ through $PDS_N$.

Referring to FIGS. 1 through 6, the tessellation data generator 170 generates a hierarchical data structure, e.g., the group data structure GDS, the patch data structures $PDS_1$ through $PDS_N$, and the control point data structures $CDS_1$ through $CDS_N$ from the patch data of each of a plurality of patches transmitted from the memory 400. The tessellation data generator 170 may encode the data structures and generate encoded data structures. The tessellation data generator 170 may output the encoded data structures to the GPU 200A.

In an exemplary embodiment, the tessellation data generator 170 compresses the data structures and transmits the compressed data structures to the GPU 200A. In an exemplary embodiment, the tessellation data generator 170 compresses only the patch data structures $PDS_1$ through $PDS_N$ and the control point data structures $CDS_1$ through $CDS_N$ and transmits compressed data structures and the group data structure GDS to the GPU 200A.

The patch data structures $PDS_1$ through $PDS_N$ may be efficiently compressed using data similarity among the patch data structures $PDS_1$ through $PDS_N$ and the control point data structures $CDS_1$ through $CDS_N$ may be more efficiently compressed due to high spatial locality of control points included in each of the patch and compressed data structures are transmitted to the GPU 200A, so that the tessellation data generator 170 may reduce waste of the bandwidth of data transmitted to the GPU 200A and also decrease power consumption for the transmission of the data.

In an exemplary embodiment, the tessellation data generator 170 stores the data structures GDS, $PDS_1$ through $PDS_N$, and $CDS_1$ through $CDS_N$ in the memory 400. Accordingly, the GPU 200A may reduce waste of the bandwidth of data and power consumption when reading the data structures GDS, $PDS_1$ through $PDS_N$, and $CDS_1$ through $CDS_N$ from the memory 400.

The GPU 200A may perform operations related with graphics processing to reduce the load of the CPU 110A. For instance, the GPU 200A may process data included in data structures, e.g., the group data structure GDS, the patch data structures $PDS_1$ through $PDS_N$, and the control point data structures $CDS_1$ through $CDS_N$ generated by the tessellation data generator 170 to perform a graphics processing related operation, e.g., a tessellation operation.

Figure 7:
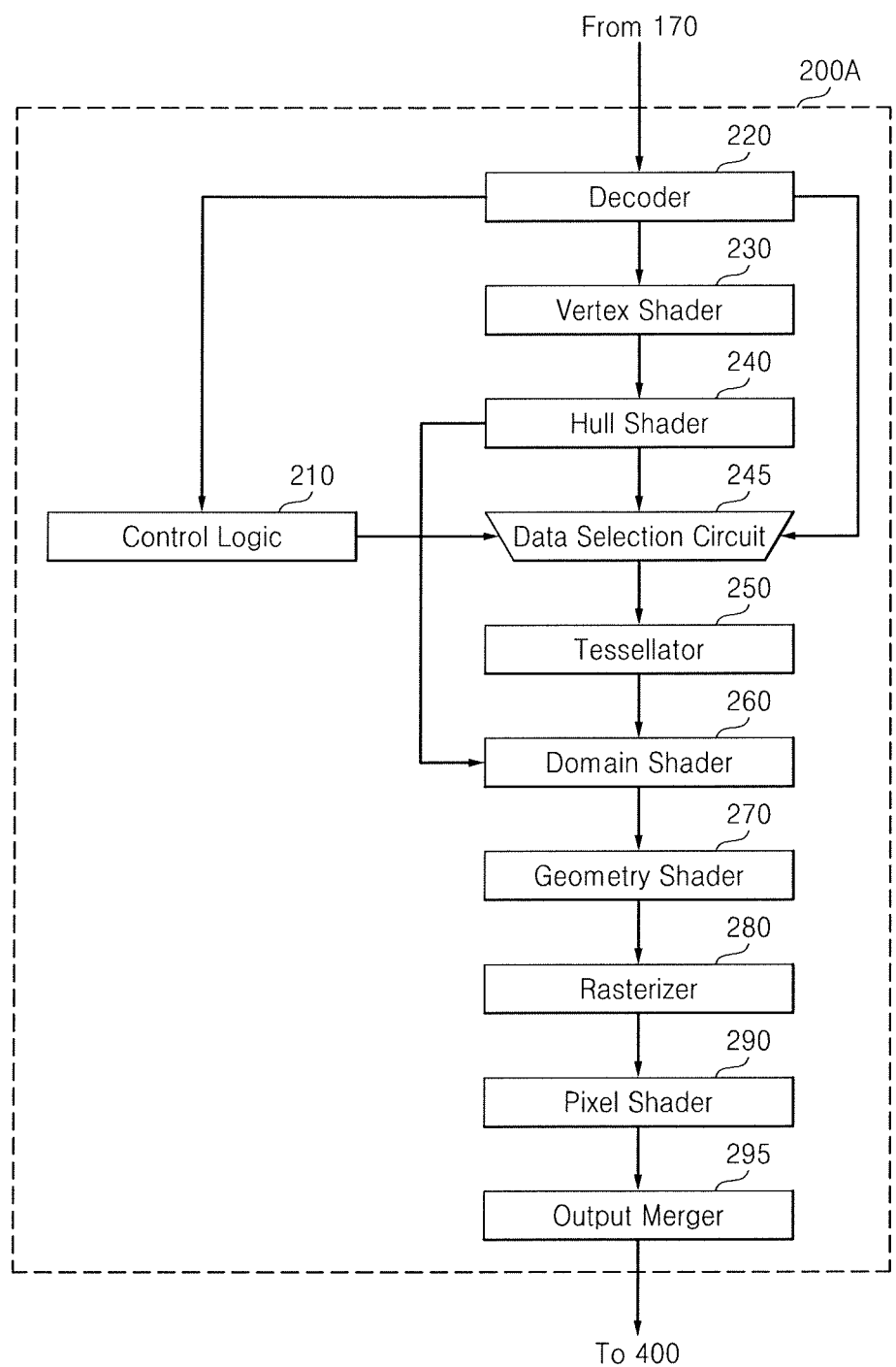
FIG. 7 is a schematic block diagram of a graphics processing unit illustrated in FIG. 1 according to an exemplary embodiment of the inventive concept.

FIG. 7 is a schematic block diagram of the GPU 200A illustrated in FIG. 1. Although data input to the GPU 200A is data output from the tessellation data generator 170 in the embodiment illustrated in FIG. 7, the data input to the GPU 200A may be data output from the memory 400 in another embodiment.

Referring to FIGS. 1 through 7, the GPU 200A includes a control logic 210, a decoder 220, a vertex shader 230, a hull shader 240, a data selection circuit 245, a tessellator 250, a domain shader 260, a geometry shader 270, a rasterizer 280, a pixel shader 290, and an output merger 295.

The control logic 210 may control the overall operation of the GPU 200A. For instance, the control logic 210 may control the operation of the components 220, 230, 240, 245, 250, 260, 270, 280, 290, and 295. Each of the components 230, 240, 250, 260, 270, 280, 290, and 295 may be a unit that performs a program instruction (or a shading program), which is related with graphics processing and is output from the RAM 130, according to the control of the control logic 210.

For instance, the program instruction may include a vertex shader program instruction, a hull shader program instruction, a tessellator program instruction, a domain shader program instruction, a geometry shader program instruction, a rasterizer program instruction, a pixel shader program instruction, and/or an output merger program instruction. The control logic 210 generates a control signal (or a selection signal) for controlling the data selection circuit 245 according to control information included in data output from the decoder 220.

The decoder 220 processes data structures generated from the tessellation data generator 170 and outputs data included in the processed data structures to the vertex shader 230 and/or the data selection circuit 245 according to the control of the control logic 210.

In an exemplary embodiment, the decoder 220 decodes encoded data structures generated from the tessellation data generator 170 and outputs data included in the decoded data structures to the vertex shader 230 and/or the data selection circuit 245 according to the control of the control logic 210. In an exemplary embodiment, the decoder 220 decompresses compressed data structures generated from the tessellation data generator 170 and outputs data included in the decompressed data structures to the vertex shader 230 and/or the data selection circuit 245 according to the control of the control logic 210.

Although an output signal (or data) of the decoder 220 is input to only the vertex shader 230 and/or the data selection circuit 245 in the embodiment illustrated in FIG. 7, the data included in the data structures generated from the tessellation data generator 170 may be processed by the decoder 220 and then input to the components 230, 240, 245, 250, 260, 270, 280, 290, and 295 according to the control of the control logic 210 in other embodiments.

The vertex shader 230 processes data output from the decoder 220, e.g., the attribute data AD included in each of the control point data structures $CDS_1$ through $CDS_N$. For instance, the vertex shader 230 may process the attribute data AD using an operation such as transformation, morphing, skinning, or lighting. The vertex shader 230 may output processed attribute data to the hull shader 240.

The hull shader 240 may determine a tessellation factor for a patch corresponding to the processed attribute data output from the vertex shader 230. In an exemplary embodiment, the hull shader 240 determines the tessellation factor based on data output from the decoder 220, e.g., the partitioning type PT included in the shared data S_DATA of the group data structure GDS according to the control of the control logic 210. The hull shader 240 may output the determined tessellation factor to the data selection circuit 245.

The data selection circuit 245 may output the determined tessellation factor output from the hull shader 240 or the tessellation factor TF output from the decoder 220 to the tessellator 250 according to the level of a control signal output from the control logic 210. According to an exemplary embodiment, the tessellation factor TF is included in the shared data S_DATA of the group data structure GDS. In an exemplary embodiment, the tessellation factor TF is included in the non-shared data NS_DATA of each of the patch data structures $PDS_1$ through $PDS_N$.

For instance, when the control signal is at a first level, e.g., logic 0 or logic low, the data selection circuit 245 may output the determined tessellation factor output from the hull shader 240 to the tessellator 250. When the control signal is at a second level, e.g., logic 1 or logic high, the data selection circuit 245 may output the tessellation factor TF output from the decoder 220 to the tessellator 250. According to an exemplary embodiment, the data selection circuit 245 is implemented as a multiplexer.

The tessellator 250 may tessellate tessellation domain coordinates based on the tessellation factor output from the data selection circuit 245. For instance, the tessellation domain coordinates may be defined as (u, v) or (u, v, w). The letters 'u' and 'v' may denote the axes of a 2D texture when UV mapping is used to project a texture map onto a 3D object. UVW coordinates are used in UVW mapping, which allows texture maps to wrap in complex ways onto irregular surfaces. Each point in a UVW may correspond to a point on a surface. According to an exemplary embodiment, the tessellator 250 tessellates the tessellation domain coordinates according to the partitioning PT, the domain face type DFT, and the output data topology OT included in the shared data S_DATA of the group data structure GDS output from the decoder 220. The tessellator 250 may output tessellated domain coordinates to the domain shader 260.

The domain shader 260 may calculate spatial coordinates corresponding to the tessellated domain coordinates. For instance, the spatial coordinates may be defined as (x, y, z). The domain shader 260 may generate primitives such as dots, lines, and triangles using the calculated spatial coordinates. In an exemplary embodiment, the domain shader 260 generates primitives according to the domain face type DFT and the output data topology OT included in the shared data S_DATA of the group data structure GDS output from the decoder 220 The domain shader 260 may output the primitives to the geometry shader 270.

The geometry shader 270 may generate new primitives by adding or removing vertices adjacent to the primitives output from the domain shader 260. In an exemplary embodiment, the geometry shader 270 generates new primitives according to the output data topology OT included in the shared data S_DATA of the group data structure GDS output from the decoder 220. The geometry shader 270 may output the new primitives to the rasterizer 280.

The rasterizer 280 may convert the new primitives output from the geometry shader 270 into a plurality of pixels. The pixel shader 290 may process the pixels. For instance, the processing may be about the color or light and shade of the pixels.

In an exemplary embodiment, the pixel shader 290 performs computation operations to process the pixels. The computation operations may include texture mapping and color format conversion. The texture mapping may be an operation of mapping a plurality of texels output from the memory 400 to add details to a plurality of pixels. The color format conversion may be an operation of converting a plurality of pixels into an RGB format, a YUV format, or a YCoCg format.

The output merger 295 confirms final pixels to be displayed on the display 300 among the processed pixels using information about previous pixels and may generate color of the final pixels. For instance, the information about the previous pixels may include depth information, stencil information, and color information. The information about the previous pixels may be stored in the memory 400. The output merger 295 may output pixel data (or image data) about the final pixels to the memory 400.

The display 300 may display an image corresponding to image data output from the display controller 140. The display 300 may be implemented as a touch screen, a liquid crystal display, a thin film transistor LCD (TFT-LCD), a light emitting diode (LED) display, an organic LED (OLED) display, an active matrix OLED (AMOLED) display, or a flexible display.

The memory 400 may store programs and/or data to be processed by the CPU 110A, the tessellation data generator 170, and/or the GPU 200A. For instance, the memory 400 may store data related with graphics processing, e.g., patch data of a plurality of patches.

The memory 400 may be implemented as a volatile or non-volatile memory. The volatile memory may be implemented as DRAM, SRAM, thyristor RAM (T-RAM), zero capacitor RAM (Z-RAM), or twin transistor RAM (TTRAM). The non-volatile memory may be implemented as electrically erasable programmable ROM (EEPROM), flash memory, magnetic RAM (MRAM), spin-transfer torque MRAM (STT-MRAM), conductive bridging RAM (CBRAM), ferroelectric RAM (FeRAM), phase-change RAM (PRAM), resistive RAM (RRAM), nanotube RRAM, polymer RAM (PoRAM), nano floating gate memory (NFGM), holographic memory, molecular electronic memory device, or insulator resistance change memory.

The non-volatile memory may be implemented as a flash-based memory device such as a secure digital (SD) card, a multimedia card (MMC), an embedded MMC (eMMC), a universal serial bus (USB) flash drive, or a universal flash storage (UFS). The non-volatile memory may also be implemented as a hard disk drive (HDD) or a solid state drive (SSD).

Figure 8:
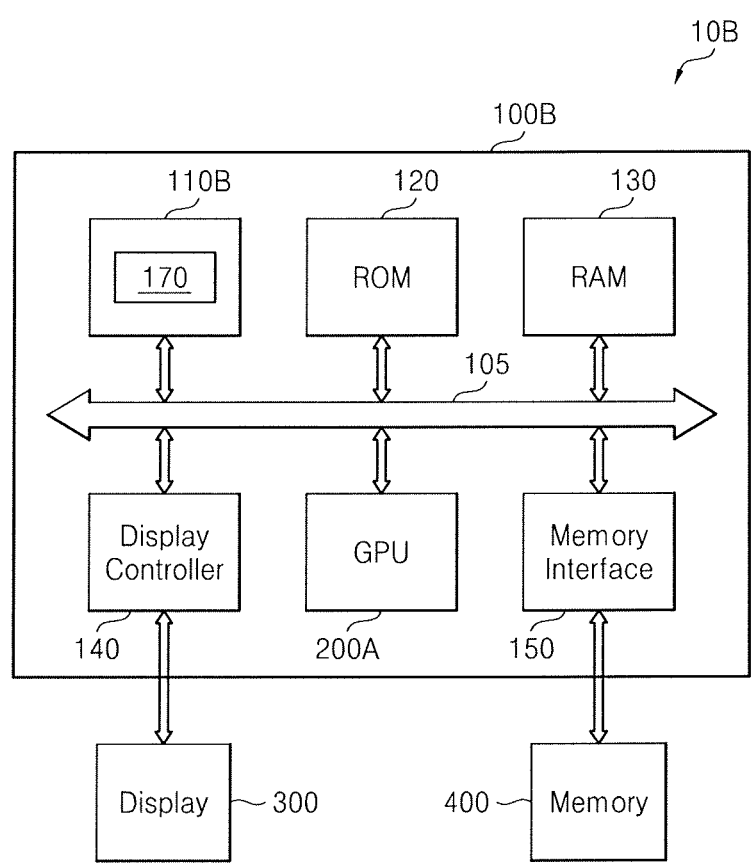
FIG. 8 is a block diagram of a data processing system according to other embodiments of the inventive concept.

FIG. 8 is a block diagram of a data processing system 10B according to an exemplary embodiment of the inventive concept. Referring to FIG. 8, the data processing system 10B includes a data processing device 100B, the display 300, and the memory 400.

The data processing device 100B includes a CPU 110B, the ROM 120, the RAM 130, the display controller 140, the memory interface 150, and the GPU 200A. The tessellation data generator 170 implemented within the data processing device 100A illustrated in FIG. 1 may be implemented within the CPU 110B.

The tessellation data generator 170 may be implemented in hardware and/or software and may operate according to the control of the CPU 110B. In other words, the CPU 110B may analyze the patch data of a plurality of patches and generate tessellation data (e.g., the shared data S_DATA shared by the patches, the non-shared data NS_DATA that are not shared by the patches, and the attribute data AD on the attribute of control points of each of the patches) from the patch data according to the analysis result.

In addition, the CPU 110B may maintain the group data structure GDS relating to the shared data S_DATA, the patch data structures $PDS_1$ through $PDS_N$ relating to the non-shared data NS_DATA, and the control point data structures $CDS_1$ through $CDS_N$ relating to the attribute data AD based on the shared data S_DATA, the non-shared data NS_DATA, and the attribute data AD. The CPU 110E may output the data structures, e.g., the group data structure GDS, the patch data structures $PDS_1$ through $PDS_N$, and the control point data structures $CDS_1$ through $CDS_N$, to the GPU 200A. The data structures may be stored in the memory 400 according to the control of the CPU 110B.

Figure 9:
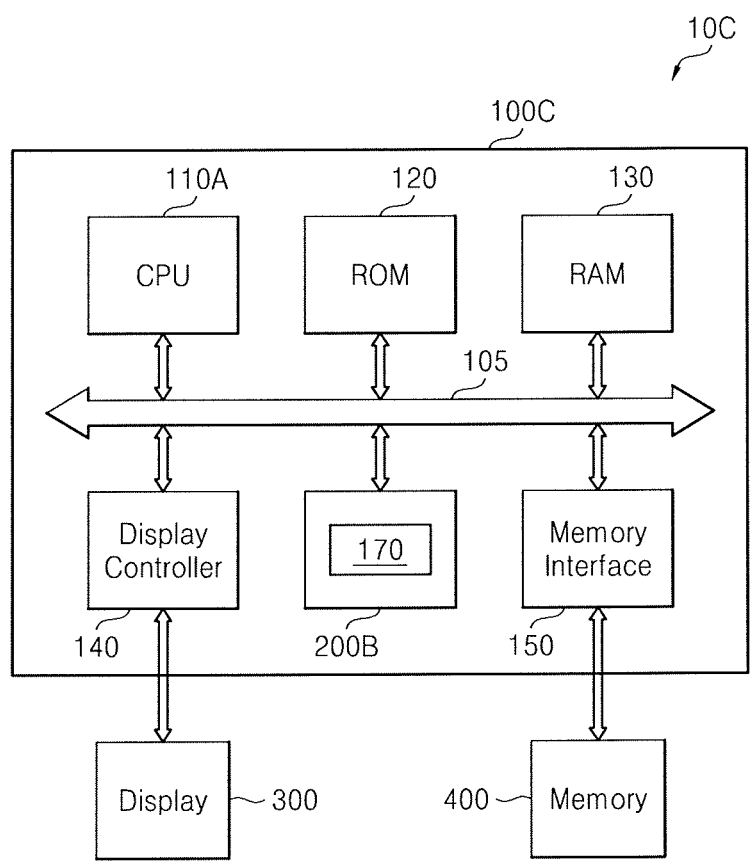
FIG. 9 is a block diagram of a data processing system according to an exemplary embodiment of the inventive concept.

FIG. 9 is a block diagram of a data processing system 10C according to an exemplary embodiment of the inventive concept. Referring to FIG. 9, the data processing system 10C includes a data processing device 100C, the display 300, and the memory 400.

The data processing device 100C includes the CPU 110A, the ROM 120, the RAM 130, the display controller 140, the memory interface 150, and a GPU 200B. The tessellation data generator 170 implemented within the data processing device 100A illustrated in FIG. 1 may be implemented within the GPU 200B.

The tessellation data generator 170 may be implemented in hardware and/or software and may operate according to the control of the GPU 200B. In other words, the GPU 200B may analyze the patch data of a plurality of patches output from the memory 400 and generate tessellation data (e.g., the shared data S_DATA shared by the patches, the non-shared data NS_DATA that are not shared by the patches, and the attribute data AD on the attribute of control points of each of the patches) from the patch data according to the analysis result.

In addition, the GPU 200B may maintain the group data structure GDS relating to the shared data S_DATA, the patch data structures $PDS_1$ through $PDS_N$ relating to the non-shared data NS_DATA, and the control point data structures CDS$_1$ through CDS$_N$ relating to the attribute data AD based on the shared data S_DATA, the non-shared data NS_DATA, and the attribute data AD. The GPU 200B may perform an operation, e.g., a tessellation operation, related with graphics processing using the data structures, e.g., the group data structure GDS, the patch data structures PDS$_1$ through PDS$_N$, and the control point data structures CDS$_1$ through CDS$_N$. The data structures may be stored in the memory 400 according to the control of the GPU 200B.

Figure 10:
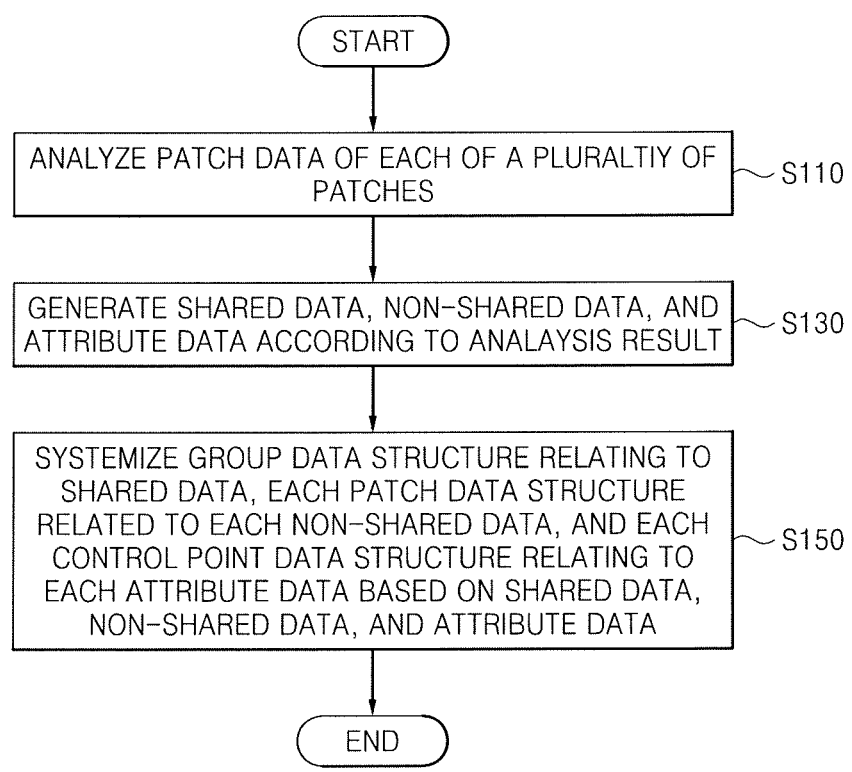
FIG. 10 is a flowchart of a method of operating the data processing system illustrated in FIG. 1, 8, or 9 according to an exemplary embodiment of the inventive concept.

FIG. 10 is a flowchart of a method of operating the data processing system 10A, 10B, or 10C illustrated in FIG. 1, 8, or 9 according to an exemplary embodiment of the inventive concept. Referring to FIGS. 1 through 10, the data processing device 100A, 100B, or 100C (collectively denoted by 100) analyze the patch data of a plurality of patches output from the memory 400 in operation S110.

The data processing device 100 generates tessellation data, e.g., the shared data S_DATA shared by the patches, the non-shared data NS_DATA that are not shared by the patches, and the attribute data AD on the attribute of control points of each of the patches, from the patch data according to the analysis result in operation S 130. The data processing device 100 maintains the group data structure GDS relating to the shared data S_DATA, the patch data structures PDS$_1$ through PDS$_N$ relating to the non-shared data NS_DATA, and the control point data structures CDS$_1$ through CDS$_N$ relating to the attribute data AD based on the shared data S_DATA, the non-shared data NS_DATA, and the attribute data AD in operation S150.

As described above, according to at least one exemplary embodiment of the inventive concept, the patch data of a plurality of patches is analyzed and hierarchical data structures are generated with respect to the patches according to the analysis result. Since shared data that can be shared by the patches is only once embedded in one of the hierarchical data structures, when the hierarchical data structures are transmitted to a GPU, waste of the bandwidth of data may be prevented and power consumption for transmission of the data may be reduced.

In addition, a patch data structure among the hierarchical data structures may be efficiently compressed using data similarity to adjacent patch data structures and a control point data structure may also be efficiently compressed due to high spatial locality of control points, so that the GPU may prevent waste of the bandwidth of data and reduce power consumption when reading the hierarchical data structures from a memory.

At least one embodiment of the inventive concept can be embodied as computer-readable codes having computer executable instructions on a non-transitory computer-readable medium. For example, the operations of FIG. 7 or FIG. 10 may be embodied as computer executable instructions. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices.

While the inventive concept has been particularly shown and described with reference to exemplary embodiments thereof, it will be understood by those of ordinary skill in the art that various changes in forms and details may be made therein without departing from the spirit and scope of the inventive concept.

What is claimed is:

1. A method of processing patch data of image data to generate rendered image data, the method comprising:
analyzing the patch data of each of a plurality of patches;
generating shared data that is shared by the patches, non-shared data that are not shared by the patches, and attribute data on an attribute of control points of each of the patches from the patch data according to a result of the analyzing;
creating a group data structure relating to the shared data, a patch data structure relating to each of the non-shared data, and a control point data structure relating to each of the attribute data based on the shared data, the non-shared data, and the attribute data;
compressing the patch data structure and the control point data structure; and
outputting tessellation data to a graphics processing unit to generate the rendered image data, wherein the tessellation data comprises the group data structure, the compressed patch data structure, and the compressed control point data structure.

2. The method of claim 1, wherein the shared data comprises a number of control points, a partitioning type, a domain face type, output data topology, and a tessellation factor of the patches.

3. The method of claim 1, wherein the non-shared data comprises an index of each of the control points included in each of the patches and a tessellation factor of each patch.

4. The method of claim 1, wherein the group data structure comprises a pointer indicating each of patch data structures respectively matching the patches related with the group data structure.

5. The method of claim 1, wherein the group data structure comprises a pointer indicating a next group data structure to be transmitted following the group data structure and the group data structure does not comprise the pointer indicating the next group data structure when a size of the group data structure is constant.

6. A system on chip (SoC) comprising:
a tessellation data generator configured to analyze patch data of image data comprising a plurality of patches, to generate a group data structure that is shared by the patches, a patch data structure for each of the patches that is not shared by the patches, and a control point data structure comprising attribute data on an attribute of control points of each of the patches from the patch data according to a result of the analysis, and to encode the data structures by compressing the patch data structure and the control point data structure; and
a graphics processing unit (GPU) configured to decode the encoded data structures and process data comprised in the decoded data structures,
wherein the patch data structure comprises non-shared data that is not shared by the patches and the non-shared data comprises an index of each of the control points included in each of the patches and a tessellation factor of each patch.

7. The SoC of claim 6, wherein the group data structure comprises shared data that is shared by the patches and the shared data comprises a number of control points, a partitioning type, a domain face type, and output data topology.

8. The SoC of claim 6, wherein the SoC is an application processor.

9. The SoC of claim 6, wherein the tessellation data generator is implemented within a central processing unit (CPU).

10. A data processing system comprising:
the SoC of claim 6;
a memory configured to store the patch data of each of the patches; and
a memory interface configured to transmit the patch data of each of the patches from the memory to the SoC.

11. A method of processing patch data of image data to generate rendered image data, the method comprising:
generating a first data structure comprising shared data that is common to each patch among a plurality of patches;
generating a plurality of second data structures for each patch, wherein each second data structure comprises indices of all control points of the corresponding patch;
generating a plurality of third data structures for each patch, wherein each third data structure comprises attributes about the control points of a corresponding one of the second data structures;
compressing each of the second and third data structures; and
outputting a hierarchal data structure to a graphics processing unit to generate the rendered image data, wherein the hierarchal data structure comprises the first data structure, the second compressed data structure, and the third compressed data structure.

12. The method of claim 11, wherein data within the second data structures are unique from one another.

13. The method of claim 11, wherein the first data structure includes a pointer to each second data structure, and each second data structure includes a pointer to a corresponding one of the third data structures.

14. The method of claim 11, wherein the first data structure comprises a pointer to a next data structure to be transmitted that comprises shared data that is common to each patch among another plurality of patches.

15. The method of claim 11, wherein either the first data structure includes a tessellation factor common to all the patches, or each second data structure includes its own distinct tessellation factor.

* * * * *